Sept. 6, 1966    G. C. W. VAN OLPHEN    3,270,428
METHOD OF AND APPARATUS FOR DEHYDRATING FOODS OR OTHER PRODUCTS
Filed April 6, 1962    2 Sheets-Sheet 1

INVENTOR.
GEORGE C. W. VAN OLPHEN

BY Paul B. Fike
PATENT AGENT

INVENTOR.
GEORGE C. W. VAN OLPHEN
BY Paul B. Fihe
PATENT AGENT

United States Patent Office 3,270,428
Patented Sept. 6, 1966

3,270,428
METHOD OF AND APPARATUS FOR DEHYDRATING FOODS OR OTHER PRODUCTS
George C. W. van Olphen, 3720 Benton St., Santa Clara, Calif.
Filed Apr. 6, 1962, Ser. No. 185,743
9 Claims. (Cl. 34—4)

The present invention relates generally to dehydration processes and more particularly to methods of and apparatus for dehydrating perishable foods or other products.

For many years, certain foods have been dehydrated by the passing of heateed air thereover in a tunnel dryer or other apparatus. Although the actual dehydration process is effective, the heat produces certain organic chemical reactions which are deleterious to the palatibility of the foods. The advantages that result from the dehydration of foods, particularly the possibility of long-term storage without refrigeration, have led food technologists to explore alternative drying processes which would avoid the mentioned chemical reactions and thus produce dehydrated food products of high quality. Relatively recently, a process of freeze-drying has been utilized, such process consisting of freezing the food or other material to be dried and then removing the moisture by sublimation. To expedite the sublimation, the process has been conventionally carried out under vacuum conditions While such vacuum freeze-drying has been an effective dehydration process which eliminates the undesirable chemical side effects, the utilization of a vacuum itself presents certain new problems. In the first place, a carefully sealed chamber with an associated vacuum pumping system constitutes a relatively expensive installation. Furthermore, separate pre-cooling of the product to be dried is necessary and the actual dehydration process must, of necessity, be a batch-type process since the vacuum conditions must be interrupted to enable the insertion or withdrawal of the product from the sealed chamber. Additionally, the necessity of intermittent defrosting further interrupts the process so that not only is the initial cost of installation relatively high, but the operating costs of the equipment per unit of food or other product to be dried are also large.

Accordingly, it is a general object of the present invention to provide a freeze-dehydration method and apparatus therefor that can function under normal atmospheric conditions, thus to provide a relatively inexpensive installation which moreover can be operated continuously to achieve a maximum production rate for a given size installation and a minumum unit dehydration cost.

It is a feature of the invention to provide a freeze-dehydration method wherein de-humidified and sub-freezing air is continuously passed over a continuously conveyed product in a direction opposite to the direction of product movement.

It is another feature of the invention to provide a dehydration method wherein the food product is heated entirely by radiation, the amount of heat supplied being sufficient to supply the latent heat of sublimation of the dehydrating product so that ultimately although the product is maintained slightly below freezing temperature, the vapor pressure thereof is as high as possible commensurate with such maintenance of sub-freezing temperature.

Yet another feature of the invention is the provision of a dehydration process wherein the air is continuously re-circulated and, after its passage through the dehydration zone, passes through an air conditioning zone wherein the moisture is removed from the air and simultaneously the air is re-cooled to the desired temperature for re-entry to the dehydration zone.

Yet another feature of the invention in the provision of a dehydration process wherein the air is cooled and de-moisturized by subjection to a spray of a low-viscosity coolant, which, through substantially insoluble in water, adheres to the particles of moisture in the air so as to remove the same from the air stream.

It is another feature of the invention to provide for the separation of the moisture, in the form of small ice particles, from the coolant through an initial vibration of the mixture to effect a conglomeration of the particles and a subsequent filtration which separates the liquid coolant from the conglomerated ice.

A related feature is the provision for re-cooling and re-circulation of the coolant, after the ice particles have been removed therefrom, through the air stream.

It is yet another feature of the invention to provide apparatus arranged to expeditiously carry out the dehydration process in a continuous and effective manner.

Since the method hereinafter to be described in detail is of principal utility in the dehydration of foods, it will be specifically described in this connection, although it will be apparent that a rapid and effective dehydration of other products can be achieved thereby.

Generally, the method entails the positioning of food to be dried in a confined dehydration zone and simultaneously applying radiant heat to the food and blowing cold dry air thereover in an amount and at a temperature to maintain the radiantly heated food below 32° F. whereby ice within the food will be sublimated and entrained in the passing air. Preferably, the air is exposed to a spray of coolant at a temperature substantially below 32° F. which not only cools the air but removes the moisture therefrom in the form of small ice particles whereupon the cooled, de-moisturized air can be recirculated through the aforementioned dehydration zone.

The method can be described in greater detail with specific reference to the accompanying drawings that illustrate an apparatus for carrying out the method in a particularly efficacious manner and wherein.

Figure 1:
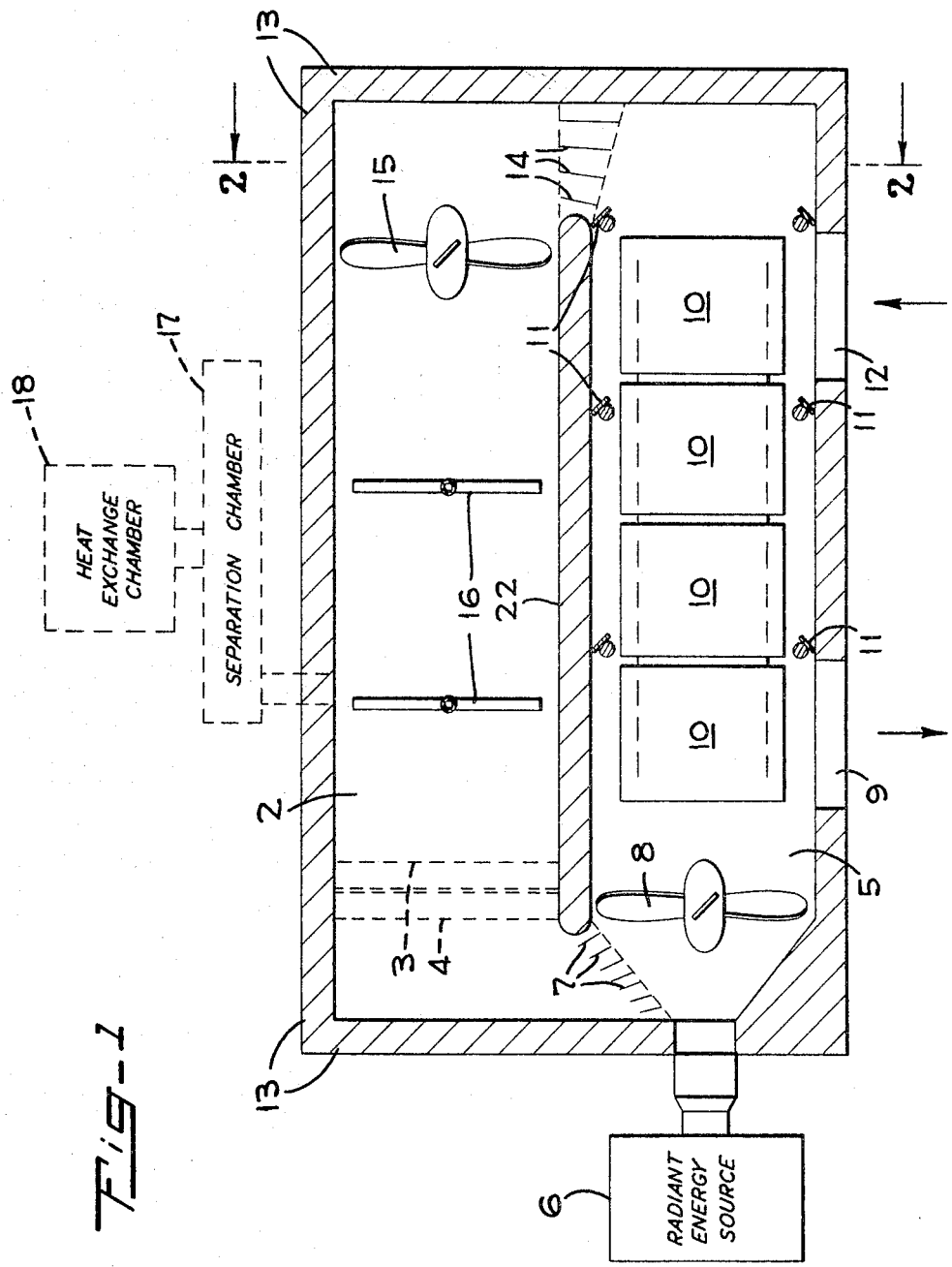
FIG. 1 is a diagrammatic top plan view of the apparatus with its top removed.
Figure 2:
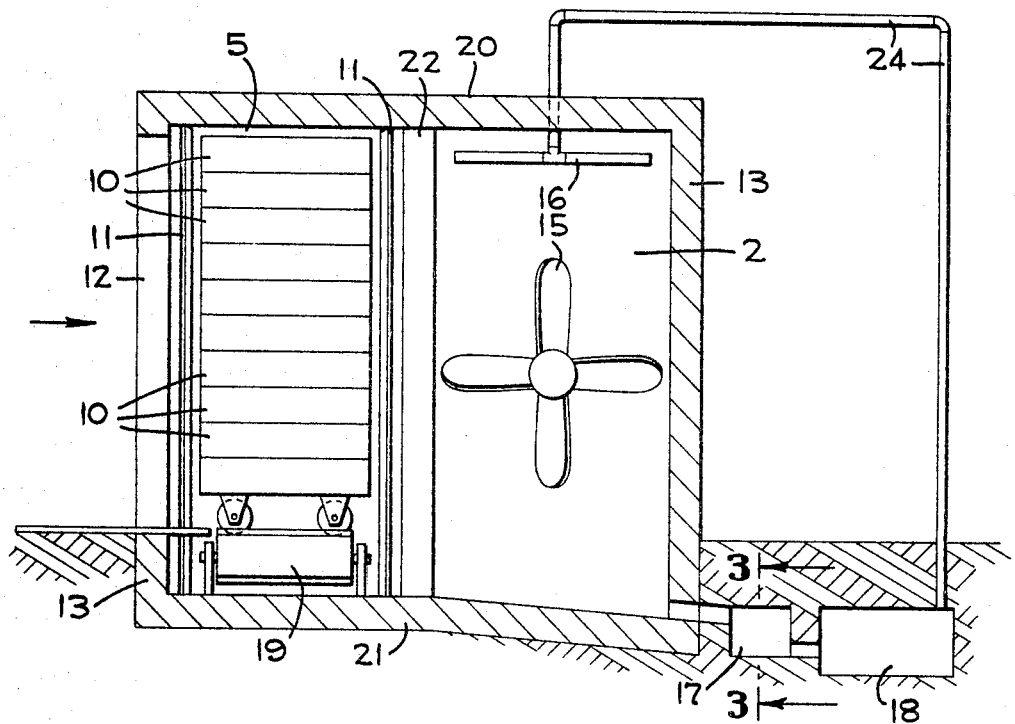
FIG. 2 is a diagrammatic vertical sectional view taken substantially along line 2—2 of FIG. 1.

With particular reference to FIGS. 1 and 2, the apparatus includes a chamber which is substantially enclosed by rectangularly related end and side walls 13, a top 20 and a bottom 21. A central partition 22 extends through the chamber, terminating short of the end walls to thus form a continuous conduit through which an air stream can pass as will be explained in detail thereinafter. On one side of the central partition 22, a food-dehydration zone 5 is formed and on the other side of the partition, an air conditioning or more particularly an air-reconditioning zone 2 is provided.

Adjacent the food-dehydration zone 5, spaced openings 9 and 12 are provided in the side wall 13, one to permit ingress of the food to be dried and the other to provide egress thereof. As illustrated, the food is preferably placed on trays 10 which are in turn stacked to leave an air space above the food. The tray stacks are placed upon a cart which can be rolled into the entrance opening 12 for reception on a conventional endless belt conveyor 19 that is suitably driven to transport the entire cart slowly to the left as viewed in FIG. 1 until the cart has reached a position opposite the exit opening in the side wall 13 through which it can then be removed. The rate of conveyor movement is dependent upon a number of factors including the characteristics of the food being dehydrated, but is obviously adjusted to provide for completion of the dehydration as the cart reaches its position opposite the exit opening 9 in the side wall 13. If desired, the entrance and exit openings 9 and 12 can be provided with doors, which are normally closed, and are opened only to allow the ingress or egress of a cart.

A driven rotary fan 15 is positioned at the entrance end of the air-conditioning zone 2 of the continuous conduit formed around the central partition 22 to direct air through the zone 2 and then through the dehydration zone 5 over the food supported on the trays 10. Obviously, the requisite temperature of the air and the rate of air flow will be determined by a number of factors including the food to be dehydrated but under all circumstances, the cold dry air will be below 32° F. Furthermore, it will be observed that the flow of air is in counter-current relationship to the movement of the food-supporting trays 10 so that the food having the lowest moisture content is subjected to the cold fully de-moisturized air first entering the dehydration zone 5 to thus provide a maximum differential between the moisture content of the food and the moisture content of the air.

To maximize the vapor pressure differential and thus expedite the rate of dehydration, radiant energy is directed against the food in the dehydration zone. Preferably highly-directive radiant energy at microwave frequencies is generated by a magnetron or similar source indicated at 6 to pass longitudinally through the dehydration zone 5 in a direction also counter-current to the motion of the food trays 10 therethrough. An air-impelled metal-bladed fan 8 adjacent the radiant-energy source disperses the energy so as to fill the entire zone. As can be clearly visualized by reference to FIG 1, the food resting on the cart adjacent the exit opening 9 in the side wall 13 is subjected to the maximum radiant energy as well as the lowest temperature and driest air to thus facilitate the removal of the final moisture therefrom. Adjacent the sides of the other carts, metal deflectors 11 are pivotally supported to provide a controlled deflection of the radiant high frequency energy inwardly. Pivotal adjustment of these deflectors 11 can be utilized to control the amount of radiant energy supplied to the food on any of the carts. The amount of radiant energy so supplied is of course related to the temperature and rate of flow of the cold-dehumidified air, the relationship being such that the food remains below 32° F. so that the moisture removal is entirely a sublimation process. The latent heat of sublimation of ice being well established, a preliminary calculation of the amount of moisture to be removed from the food will enable the establishment of the correct air temperature, air flow rate, and radiant energy to be applied to assure that the emergent food is below the requisite moisture content. Preferably, the air entering the dehydration zone 5 is at or below 0° F. and the amount of radiant energy applied to the food must then be sufficient not only to supply the latent heat of sublimation but to keep the food at a relaively higher temperature such as 30°F. Such temperature differential between food and the air obviously increases the vapor pressure differential therebetween and thus allows the sublimation process to take place at a relatively rapid rate.

The air, after its passage over the food on the carts, moves around the end of the central partition 22 and is given further impetus by the described rotary fan 15 for continued motion through the air-conditioning zone 2. Since the air is not only de-moisturized but is re-cooled in this air-conditioning zone, preferably appertured metal baffles 7, 14 are disposed between the ends of the central partition 22 and the end walls 13 of the chamber so as to preclude entry of radiant energy into such air conditioning zone.

In the air conditioning zone 2, the blown subfreezing air with the moisture entrained is directed through two or more sprays of coolant which emanate from a plurality of nozzles 16 adjacent the top of the air conditioning zone and form transverse fluid curtains against which the air is projected. The coolant has complete fluidity over a wide temperature range and, dependent upon the rate of air flow, is projected into the air conditioning zone at a temperature between −30° F. and −90° F. Although the coolant must be substantially insoluble in water, it, of necessity, must have the quality of considerable adherence thereto so that as the air is directed against the coolant, the particles of moisture are intermixed with the coolant and are entrained therewith to move the lower or bottom portion of the air conditioning zone 2. Preferably, low viscosity organic silicates such as tetra (2-ethylbutyl) silicate or tetra (2-ethylhexyl) silicate are utilized as the coolant although other liquids having the mentioned requisite characteristics can be substituted therefor. Beyond the curtains of coolant, at the remote end of the air conditioning zone 2, air-permeable curtains 3, 4 are supported to allow egress of the cold de-moisturized air for return to the dehydration zone 5 but to preclude removal of ice or liquids from the air conditioning zone.

Figure 3:
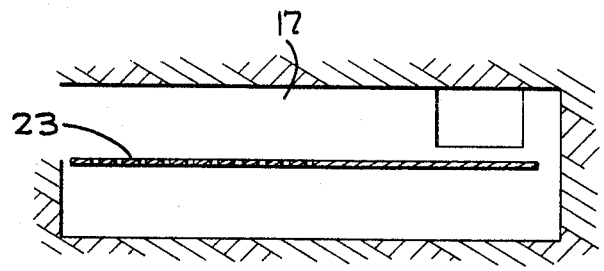
FIG. 3 is a diagrammatic vertical sectional view taken along line 3—3 of FIG. 2.

The coolant and entrained moisture in the form of small ice particles flow from the bottom of the air-conditioning zone 2 through a conduit onto one end of a vibrating screen 23 mounted for longitudinal reciprocation in a small coolant-ice separation chamber 17. As shown best in FIG. 3 the initial portion of the screen 23 which receives the mixture of coolant and ice particles constitutes an impervious plate along which the mixture moves while it is vibrated. Such vibration effects periodic contact between the ice particles whose coherent force is greater than the adherent force connecting the ice particles to the coolant so that a gradual increase in the size of the ice particles results. The effect is similar to the commonly observed property of snow or ice to "ball." After passage over the initial impervious portion of the vibrating screen 23 the coolant and relatively large particles of ice move onto the previous portion of the screen which retains the ice particles but permits the coolant to flow downwardly therethrough. The ice particles continue along the vibrating screen 23 to be dumped from the remote end thereof while the separated coolant flows through a discharge conduit into a heat exchange chamber indicated at 18 of conventional design wherein the coolant is re-cooled and then pumped upwardly through a pipe 24 which connects to the spray nozzles 16.

Various obvious modifications can be made in the described apparatus or in the actual method without departing from the spirit of the invention. For example, under certain conditions it may be desired to circulate air at a pressure somewhat reduced below atmospheric. Under such circumstances appropriate sealing of the chamber and partial evacuation thereof is necessary. However, regardless of the actual pressure existent within the chamber, the dehydration process is to be achieved not by sublimation into a vacuum but by sublimation and entrainment of the moisture in a stream of air or other fluid medium. Accordingly the foregoing description is to be considered as purely exemplary and not in a limiting sense, and the actual scope of the invention is to be indicated by reference to the appended claims.

What is claimed is:

1. The method of dehydration of foods or other products which comprises the steps of supporting the product in the dehydration zone of a continuous conduit, at substantially atmospheric pressure applying microwave frequency radiant energy to the product to heat the same, blowing cold, dry air through the dehydration zone in an amount and at a temperature to maintain the radiantly-heated product below 32° F. whereby ice in the product will be sublimated and entrained in the air, then cooling and demoisturizing the air in an air-conditioning zone of the continuous conduit at a position removed from the dehydration zone, and finally returning the conditioned air to the dehydration zone.

2. The method of dehydration of foods or other products according to claim 1 which comprises the additional step of moving the product through the dehydration zone in a direction opposite to the direction of air flow therethrough.

3. The method of dehydration of foods or other products according to claim 1 which includes the additional step of selectively deflecting the radiant energy against the supported product in the hydration zone.

4. The method of dehydration of foods or other products according to claim 1 wherein the air is cooled and demoisturized by passage through a liquid curtain of sprayed coolant at a temperature between −30° F. and −90° F.

5. The method of dehydration of foods or other products according to claim 4 which comprises the additional step of separating the coolant from any moisture entrained therein.

6. The method of dehydration of foods or other products which comprises the steps of supporting the product in the dehydration zone of a continuous conduit at substantially atmospheric pressure, applying radiant heat to the product to increase the vapor pressure thereof, blowing cold, dry air through the dehydration zone of the conduit in an amount and at a temperature to maintain the radiantly-heated product below 32° F. whereby ice in the product will be sublimated and entrained in the air, spraying a liquid coolant into the air-conditioning zone of the conduit at a position removed from the dehydration zone to intermix with the moisturized air, the coolant being at a temperature substantially below 32° F. whereby the air is cooled and small ice particles are formed in adherent relation with the coolant and drop therewith to the bottom of the conduit, and then separating the ice from the liquid coolant.

7. The method of dehydration of foods or other products according to claim 6 which comprises the additional step of vibrating the mixture of liquid coolant and ice particles whereby the latter conglomerate, and the liquid and ice particles are separated by filtration.

8. The method of dehydration of foods or other products under substantially atmospheric pressure which comprises the steps of conditioning air to cool and demoisturize the same, blowing the cold, dry air against the product to be dried so as to maintain the product below 32° F. and effect sublimation of moisture from the product into the blown air, and applying microwave frequency radiant energy to the product to increase the vapor pressure thereof in an amount insufficient to raise the temperature of the product above 32° F.

9. Apparatus for dehydrating foods or other products which comprises means forming a continuous conduit through which air can recirculate between a dehydration zone and an air-conditioning zone, means for blowing air continuously through said conduit, means in said air-conditioning zone for cooling and demoisturizing the air as it passes therethrough, means supporting the product for movement through said dehydration zone in a direction opposite to the flow of air therethrough, means at one end of said conduit for applying radiant heat to the product in the dehydration zone, and means including air-permeable metal baffles for restricting the radiant heat to the dehydration zone.

References Cited by the Examiner

UNITED STATES PATENTS

| | | | |
|---|---|---|---|
| 2,115,344 | 4/1938 | Stacey | 62—93 |
| 2,249,624 | 7/1941 | Bichowsky | 34—27 |
| 2,515,098 | 7/1950 | Smith | 34—80 X |
| 2,728,387 | 12/1955 | Smith. | |
| 2,897,600 | 8/1959 | Graham | 34—5 |
| 2,907,117 | 10/1959 | Parkinson et al. | 34—5 X |
| 2,959,930 | 11/1960 | Munters | 62—93 |
| 3,020,645 | 2/1962 | Copson | 34—5 |
| 3,096,163 | 7/1963 | Meryman | 34—80 X |
| 3,132,929 | 5/1964 | Thuse | 34—77 |

FOREIGN PATENTS 46,243  7/1939  Netherlands.

ROBERT A. O'LEARY, *Primary Examiner.*

NORMAN YUDKOFF, *Examiner.*

W. E. WAYNER, *Assistant Examiner.*